United States Patent Office 3,663,413
Patented May 16, 1972

3,663,413
DEVICE FOR ELECTROLYTICALLY INDUCING FLOCCULATION FOR WATER TREATMENT PLANTS
Anthony R. Marmo, Cheswick, Pa., assignor to Westinghouse Electric Corporation, Pittsburgh, Pa.
Filed Feb. 6, 1970, Ser. No. 9,375
Int. Cl. B01k 3/00
U.S. Cl. 204—275          4 Claims

ABSTRACT OF THE DISCLOSURE

A device for artificially inducing flocculation to aid in sewage treatment processes; which device comprises sacrificial electrodes suspended in an aeration tank above the air diffusers. The electrodes produce metallic hydroxides in solution which act as flocculating agents on sewage particles. The air diffusers act to keep the electrodes clean and to mix the metallic hydroxides with the sewage particles.

BACKGROUND OF THE INVENTION

This invention pertains to water treatment processes and more particularly to sewage plants wherein the sewage particles are flocculated before entering a solids separation chamber.

A presently preferred embodiment of a sewage treatment plant, as for example that described in copending application Ser. No. 715,636, entitled "Separation Process and Apparatus," filed Mar. 25, 1968, by Anthony R. Marmo includes in general a sewage preparation chamber and a solid separation chamber flow-coupled in series relationship. The sewage preparation chamber as described in the above application comprises an aeration chamber wherein air diffusers circulate the sewage influent so as to cause the larger sewage particles to be broken down to a more optimum size and so as to cause the aerobic bacteria to grow to more optimum size. In certain applications, it has been found desirable to add a chemical flocculating agent to the aeration chamber of such a plant; which agent causes the bacteria to adhere or agglomerate to a sufficient degree to make subsequent separation in the series coupled separation chamber more feasible.

The use of such chemical flocculating agents however has several inherent disadvantages. Mechanical metering pumps of some sort must be provided. Metering pumps usually create substantial maintenance problems, are expensive and must be frequently checked and adjusted. Moreover, the chemical additives are fairly expensive and create handling problems, i.e., storage tank and associated piping must be added to an already complex system.

SUMMARY OF THE INVENTION

The aforementioned difficulties can be obviated by providing the aeration chamber of a sewage treatment plant with sacrificial electrodes preferably suspended above the air diffusers. The use of sacrificial electrodes instead of chemical additives accomplishes flocculation in a low cost maintenance free manner. The electrodes can be formed as plates which may be wired to form an alternate anode-cathode configuration. A low current potential imposed on these plates will cause the electrodes to hydrolize the fluid in the vicinity of the plates. Metallic hydroxides are thus formed which are known to induce flocculation in a sewage medium.

As previously indicated the electrode set is preferably suspended above the air diffusers. The plates of the electrode set are accordingly kept relatively free from scale which might otherwise decrease their performance. The diffusers also act to disperse the metallic hydroxides among the fluid particles.

Further, the location of the electrode set in the aeration tank provides suitable access for repair and replacement of same.

DESCRIPTION OF THE DRAWINGS

For a more complete understanding of the invention reference may be had to the accompanying drawings which show an exemplary embodiment of the invention, in which.

DESCRIPTION OF THE PREFERRED EMBODIMENT

Figure 1:
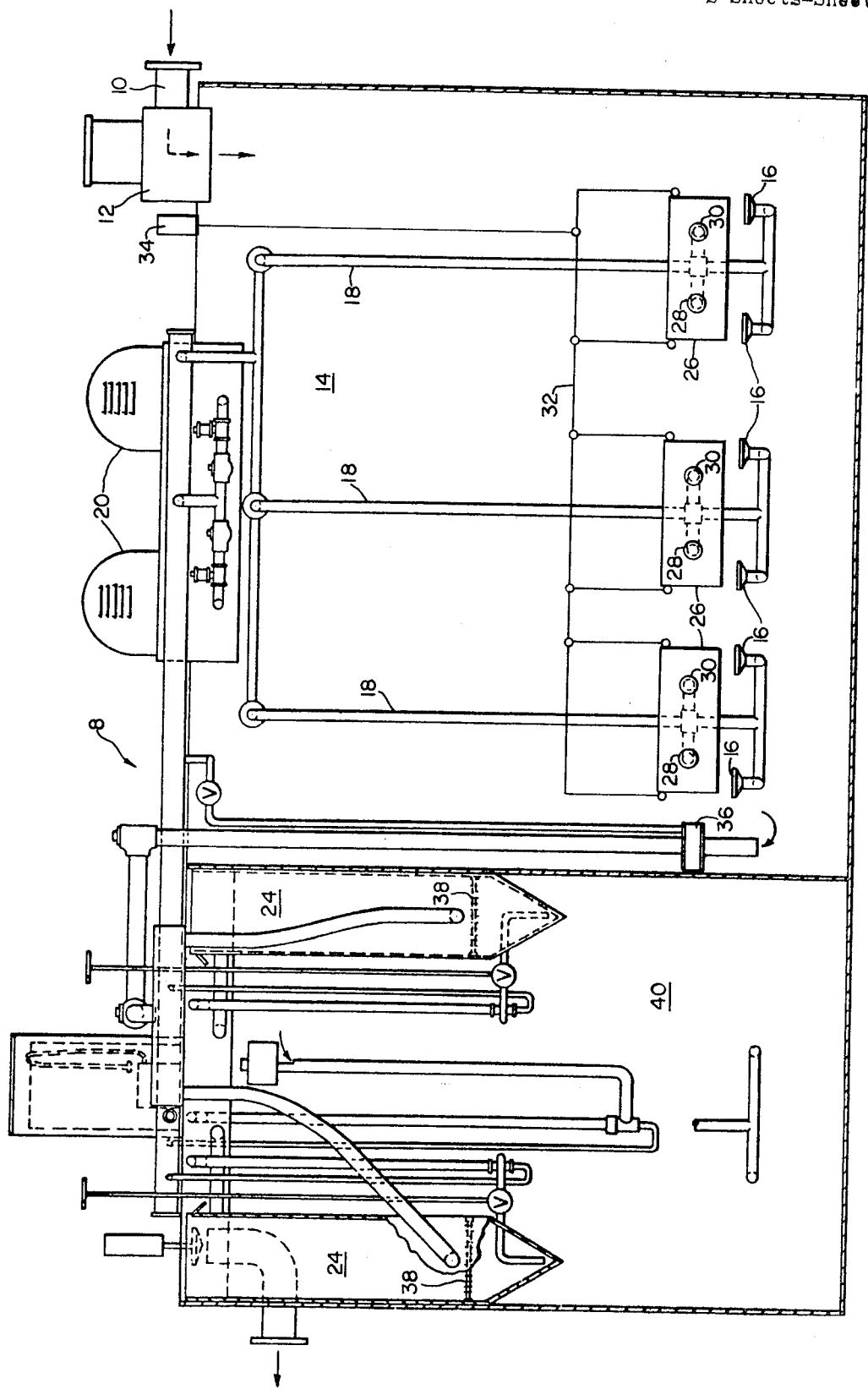
FIG. 1 shows an elevational view of a sewage treatment plant in accordance with this invention.
Figure 2:
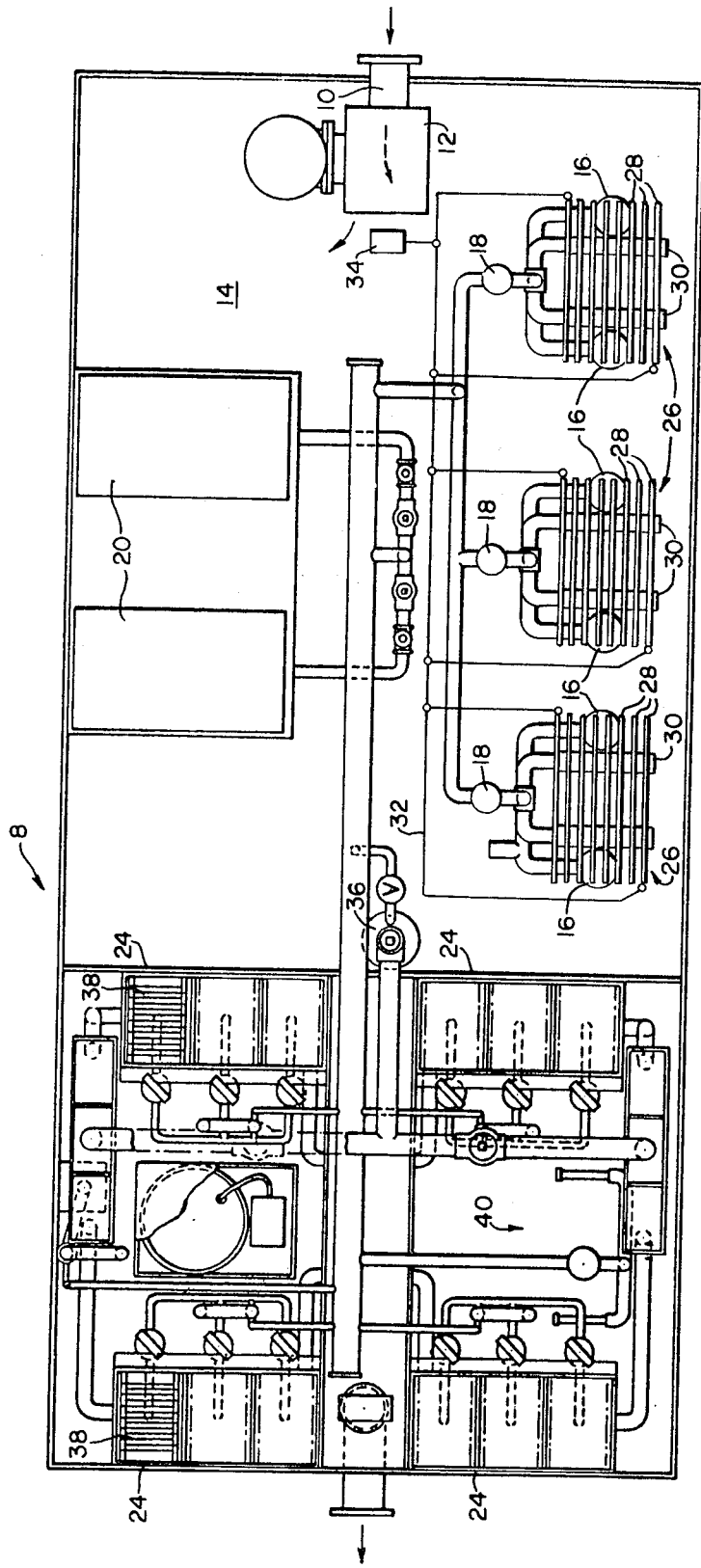
FIG. 2 shows a plan view of same.

Referring to FIGS. 1 and 2, a separation plant 8 is shown wherein sewage or other particulate matter carried in a liquid medium enters the separation plant 8 through an influent line 10. The structure of the separation plant is generally that disclosed in the aforementioned application Ser. No. 715,636. In general, the influent line 10 first conveys the inlet stream to a cominuter 12 of conventional design which shreds any large solids which would otherwise have a deleterious affect upon the system.

The influent sewage stream then enters a relatively large receptacle 14 which serves as a surge tank and as a preparation tank for the mixed liquor influent before it undergoes separation. In its essential aspects receptacle 14 contains a plurality of diffusers 16 supported on pipes 18. The diffusers 16 are connected to air blowers 20 which are mounted above the aeration chamber 14. The diffusers 16 produce a relatively heavy stream of relatively large bubbles which cause the sewage particles to move across the bottom of the receptacle and then circulate generally in a helical pattern. The solid particles are accordingly constantly being stirred and tumbled so that the matter is generally reduced in size and rendered somewhat fluffy. The bacteria in the sewage being aerobic are stimulated by the oxygen in the aeration chamber 14 so as to consume amounts of organic matter and grow in size. The overall affect is to create particles of proper size for proper separation in a separation chamber 24, as will be described. It has also been found desirable to add amounts of a chemical flocculating agent in the aeration tank. For example amounts of ferric hydroxide or aluminum hydroxide added to the separation chamber tend to agglomerate the viscous bacteria particles so as to make their subsequent separation in chamber 24 both faster and more complete.

In order to retain the advantages of chemical flocculation and to at the same time obviate the disadvantages of having a complex chemical metering system coupled to the sewage separation plant, electrode sets 26 may be provided in the chamber 14 preferably just above the air diffusers 16.

The electrode sets 26 can be composed of a plurality of sheared plates 28. The sheared plates 28 are mounted perpendicular to the air diffusers and may be conveniently mounted on an elongated mounting member 30. Plates 28 are preferably mounted such that the flow from the air diffusers 16 may pass through parallel channels formed therebetween. Electrode sets 26 are suitably connected by electrical wiring 32 to an electrical junction 34. The electrode plates 28 are preferably constructed from type 316 stainless steel or aluminum such that ferrous hydroxide or aluminum hydroxide is produced by the low current potential imposed upon the plates 28. The metallic hydroxides given off by the plates 28 thus form a flocculating agent in the tank 14. By locating the electrodes above the air diffusers 16 the plates are kept relatively clean and free of scale because of the high velocity fluid stream passing constantly over them. The fluid stream also causes the metallic hydroxide flocculating agent to be thoroughly mixed with the aerated sewage in the tank 14. The composite structure thus efficiently conditions the sewage for subsequent separation in the previously mentioned separation chambers 24.

Briefly, as indicated in the aforementioned copending application, the conditioned sewage is conveyed by way of a metering pump 36 to one or more separation chambers 24 where the solid particles conditioned in tank 14 might be separated from the clearer liquor. In general, the separation chambers 24 are designed such that minute gas bubbles are formed near their bottom. The gas bubbles may also be conveniently produced by an electrolytic process. As can be seen each separation chamber contains a set of electrodes 38. These electrodes 38 produce a plurality of light gas bubbles which carry the solid material to the surface in the form of a scum or foam which may be then scrapped or dumped into an incinerator or biological digester 40.

I claim as my invention:

1. An apparatus for separating solid particles from a liquid medium in which they are suspended, comprising, in combination:
   a first receptacle;
   a means for supplying a liquid containing particulate matter to said first receptacle;
   means for producing air bubbles or aerating and mixing the liquid communicably coupled to the interior of said first receptacle;
   an electrode set affixed within the first receptacle and supplied from a source of low current potential so as to hydrolize at least the liquid in the vicinity of said set whereby metallic hydroxides for flocculation are formed within said first receptacle; said electrode set being so situated with respect to said means for producing air bubbles as to be kept free from scale by said means.

2. The apparatus of claim 1 including a second receptacle flow-coupled to the first receptacle and containing means in said second receptacle for separating particulate matter from its liquid medium.

3. The apparatus of claim 2 wherein the electrode set is formed from plates of aluminum.

4. The apparatus of claim 2 wherein the electrode set is formed from plates of stainless steel.

References Cited

UNITED STATES PATENTS 3,523,891  8/1970  Mehl _____ 204—149

GERALD L. KAPLAN, Primary Examiner

W. I. SOLOMON, Assistant Examiner

U.S. Cl. X.R.

204—149, 269; 210—221